United States Patent [19]

Steigerwald et al.

[11] Patent Number: 5,352,861
[45] Date of Patent: Oct. 4, 1994

[54] RESONANT HIGH-VOLTAGE PULSER FOR ARCJET THRUSTER IGNITION

[75] Inventors: Robert L. Steigerwald, Burnt Hills; John N. Park, Rexford, both of N.Y.

[73] Assignee: General Electric Co., East Windsor, N.J.

[21] Appl. No.: 955,970

[22] Filed: Oct. 2, 1992

[51] Int. Cl.$^5$ .................. B23K 9/06; B23K 9/067; B23K 9/073
[52] U.S. Cl. .................. 219/121.54; 219/121.57; 219/130.1; 219/121.52; 60/203.1
[58] Field of Search .................. 219/121.54, 121.57, 219/121.59, 130.1, 121.52; 60/203.1

[56] References Cited

U.S. PATENT DOCUMENTS

| | | | |
|---|---|---|---|
| 4,446,560 | 5/1984 | Gabor | 373/25 |
| 4,493,699 | 7/1990 | Thommes | 219/121.57 |
| 4,678,888 | 7/1987 | Camacho et al. | 219/121.54 |
| 4,766,724 | 8/1988 | Gruber | 60/203.1 |
| 4,916,599 | 4/1990 | Traxler et al. | 363/65 |

*Primary Examiner*—Mark H. Paschall
*Attorney, Agent, or Firm*—W. H. Meise; C. A. Berard; Young, S. A.

[57] ABSTRACT

A starting circuit for providing a high-voltage pulse for igniting an arc in an arcjet thruster includes a resonant capacitor for storage of the energy required to generate the high-voltage pulse. The capacitor is resonantly switched with a small resonant inductor which, in turn, resonates with a high-voltage cable capacitance, generating a high-voltage pulse via a step-up transformer to the arcjet thruster for igniting the arc. Advantageously, the transformer turns ratio is minimized, thus minimizing the required transformer size and weight; and the high-voltage pulse is isolated from the arcjet power supply semiconductor devices.

8 Claims, 3 Drawing Sheets

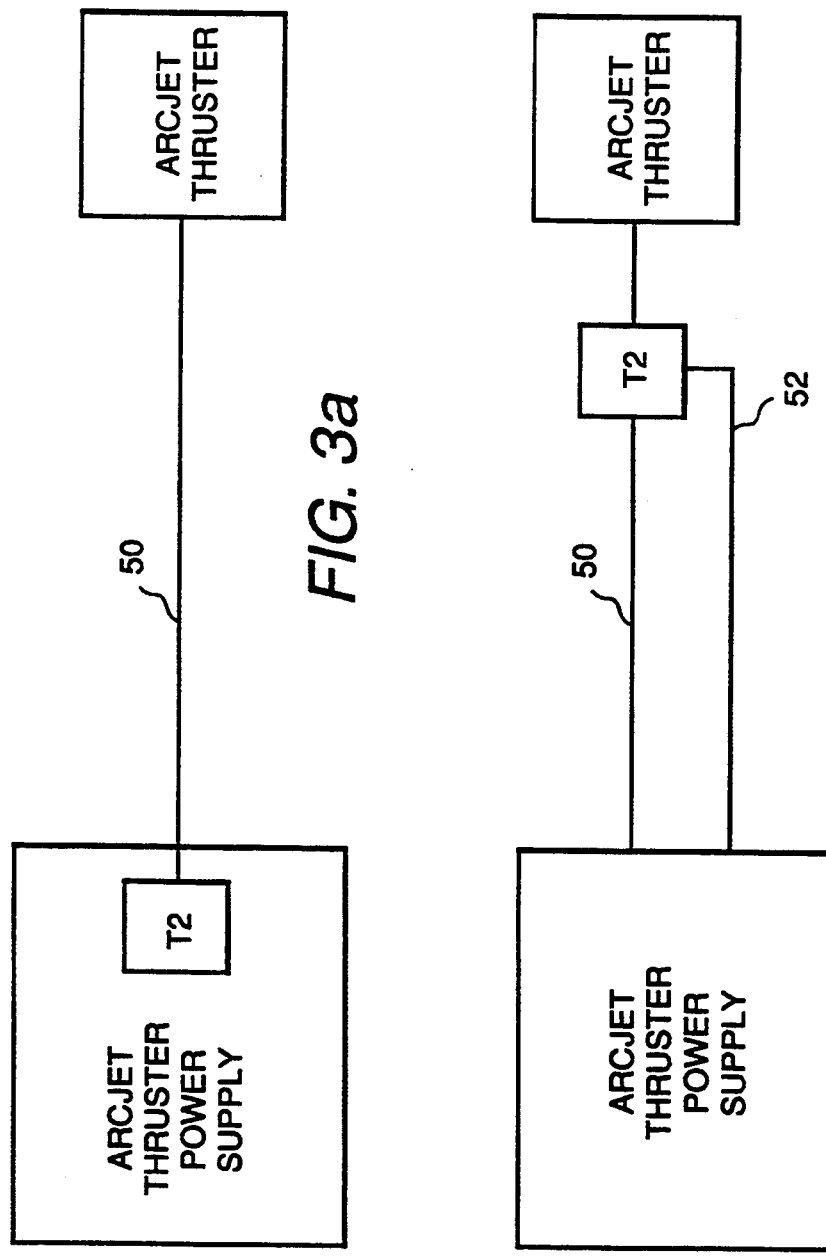

5,352,861

RESONANT HIGH-VOLTAGE PULSER FOR ARCJET THRUSTER IGNITION

RELATED APPLICATIONS

This application is related to U.S. patent application Ser. No. 07/956,130, filed Oct. 2, 1992, in the name of R. L. Steigerwald and J. N. Park, and to U.S. patent application Ser. No. 07/956,131, filed Oct. 2, 1992 in the name of J. N. Park, R. L. Steigerwald, G. D. Goodman and D. B. Stewart, both filed concurrently herewith and incorporated by reference herein.

1. Field of the Invention

The present invention relates generally to thrusters for space applications and, more particularly, to a starting circuit for providing a high-voltage pulse for igniting the arc in an arcjet thruster.

2. Background of the Invention

An arcjet thruster provides a thrust to a spacecraft by heating a gas with an electric arc and expanding the heated gas through a nozzle. Over a practical operating range, the arc has a negative resistance characteristic, i.e., arc voltage decreases with increasing arc current, and is thus inherently unstable. A typical power supply for an arcjet thruster employs a pulse width modulated (PWM) converter operating in a current-controlled mode. R. P. Gruber describes such a converter in U.S. Pat. No. 4,766,724, issued Aug. 30, 1988 and incorporated by reference herein. To ignite the arc in an arcjet thruster, a high-voltage pulse (e.g., up to 5 kV) is needed. U.S. Pat. No. 4,766,724 describes a starting circuit wherein energy is stored in an output filter inductor by turning on a switch. When the switch is opened, the energy is released in a high-voltage pulse which is applied via transformer coupling to the thruster. Disadvantageously, because the high arc ignition energy is stored in the inductor, the inductor is relatively large and heavy.

Accordingly, it is desirable to provide a starting circuit for providing a high-voltage pulse to ignite the arc in an arcjet thruster which is relatively lightweight and furthermore isolates the semiconductor switching devices in the arcjet thruster power supply from the high-voltage starting pulse.

SUMMARY OF THE INVENTION

A starting circuit for providing a high-voltage pulse for igniting an arc in a thruster (e.g., an arcjet thruster) comprises a resonant capacitor for storage of the energy required to generate the high-voltage pulse. The capacitor is resonantly switched with a small resonant inductor which, in turn, resonates with a high-voltage cable capacitance, generating a high-voltage pulse via a step-up transformer to the thruster for igniting the arc. Advantageously, the transformer turns ratio is minimized, and the igniting energy is not stored in the transformer, thus minimizing the required transformer size and weight; and the high-voltage pulse is isolated from the power supply semiconductor devices.

BRIEF DESCRIPTION OF THE DRAWINGS

The features and advantages of the present invention will become apparent from the following detailed description of the invention when read with the accompanying drawings in which:

FIG. 3a is a block diagram representation of the arc jet thruster system of FIGS. 1 and 2; and FIG. 3b is a block diagram of an arcjet thruster system according to an alternative embodiment of the present invention.

DETAILED DESCRIPTION OF THE INVENTION

Figure 1:
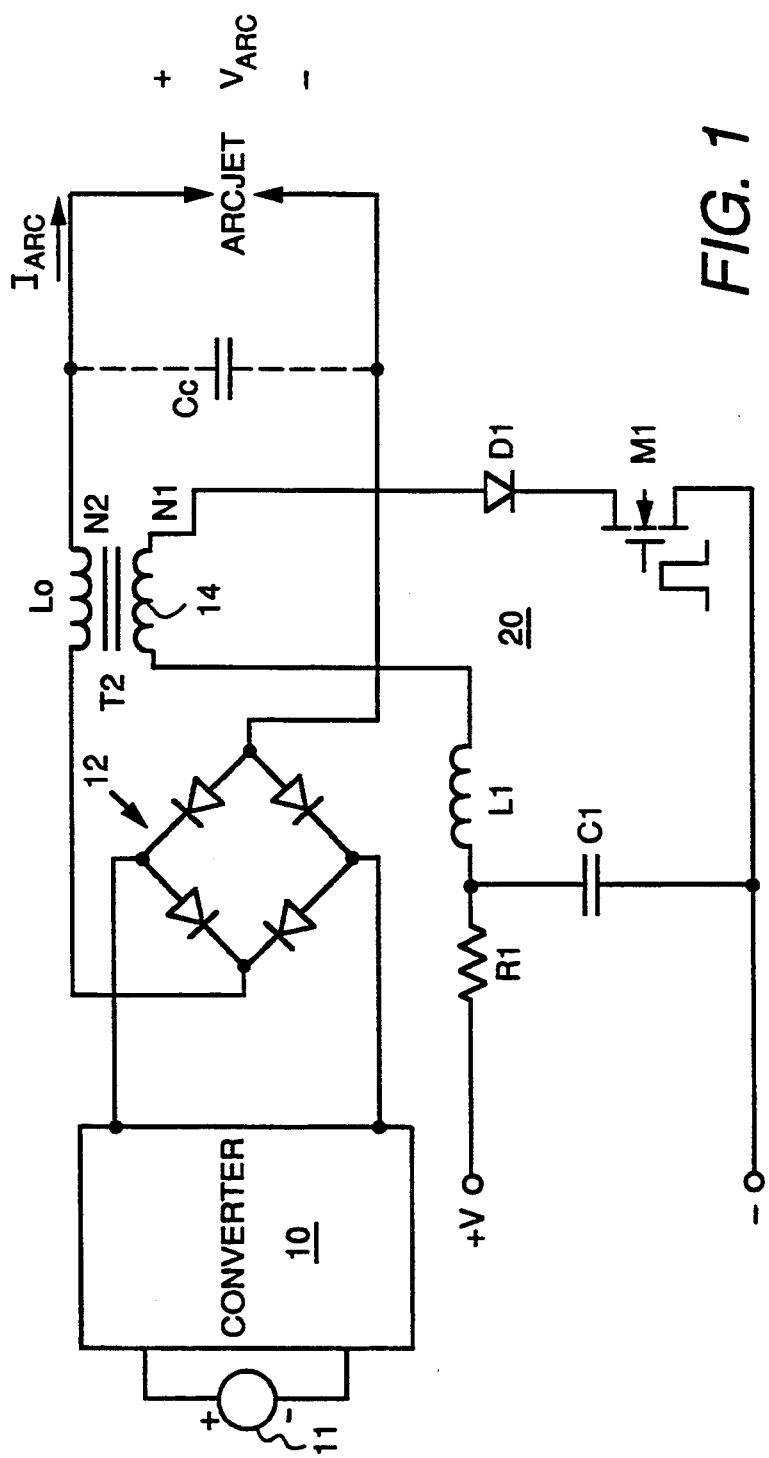
FIG. 1 schematically illustrates an arcjet thruster power supply including a resonant high-voltage pulser for igniting an arc in an arcjet thruster according to the present invention.

FIG. 1 illustrates an arcjet thruster power supply including a resonant high-voltage pulser for igniting an arc in an arcjet thruster according to the present invention. AC voltage is provided to the arcjet system of FIG. 1 from a dc source 11 via a converter 10. Any suitable converter may be employed, such as, for example, a PWM converter of a type described in Gruber U.S. Pat. No. 4,766,724, cited hereinabove. Alternatively, a suitable converter comprises a resonant converter of a type described in commonly assigned U.S. patent application Ser. No. 07/956,130, filed Oct. 2, 1992 in the name of R. L. Steigerwald and J. N. Park, cited hereinabove. The output ac voltage from converter 10 is rectified by a rectifier 12 and then filtered by a high-frequency output filter inductor Lo. The output current Iarc, as smoothed by filter inductor Lo, is supplied to the arc, and switching converter 10 is controlled to maintain a stable arc, such as in a manner described in U.S. patent application Ser. No. 07/956,130, filed Oct. 2, 1992 in the name of, cited hereinabove.

In accordance with the present invention, a high-voltage pulser circuit 20 is coupled via a transformer T2 to the arcjet thruster. In particular, as shown in FIG. 1, filter inductor Lo comprises the secondary winding of a transformer T2 having a primary winding 14. Primary winding 14, has N1 turns, and secondary winding Lo has N2 turns, N2 generally being greater than N1 in order to step-up the voltage applied to the primary winding. One terminal of primary winding 14 is coupled to the anode of a diode D1, the cathode of which is coupled to the source of a transistor M1. The other terminal of primary winding 14 is coupled to one terminal of an inductor L1. (Inductor L1 has a relatively small inductance and may comprise the leakage inductance of transformer T2.) The other terminal of inductor L1 is connected to an energy storage capacitor C1, which is coupled via a resistor R1 across a pulser dc input voltage $+V$. The capacitance of a cable connecting the arcjet power supply to the arcjet thruster is represented as capacitance Cc on the secondary side of transformer T2 and coupled across the arcjet load.

To generate a high-voltage pulse to ignite an arc, transistor M1 is turned on, causing capacitor C1 to resonate with resonant inductor L1 and cable capacitance Cc. Diode D1 is provided for blocking current if the current in the resonant circuit attempts to reverse. For a relatively high capacitance C1 (e.g., 1-5 $\mu$F) as compared with a relatively small cable capacitance (e.g., 1000 pF), the voltage on the cable capacitance Cc rings up to double the value which would otherwise be obtained from the transformer turns ratio alone. Hence, the required transformer turns ratio N2/N1 is minimized, which is advantageous because the secondary winding (having the higher number N2 of turns) carries the normal full load current as it performs its current smoothing function during normal steady-state operation. To further reduce the turns ratio N2/N1, it is desirable to have the pulser input voltage +V be as high as possible. For a typical spacecraft, the pulser input voltage +V (which is also the input voltage to the converter) is on the order of 30 to 100 volts.

Figure 2:
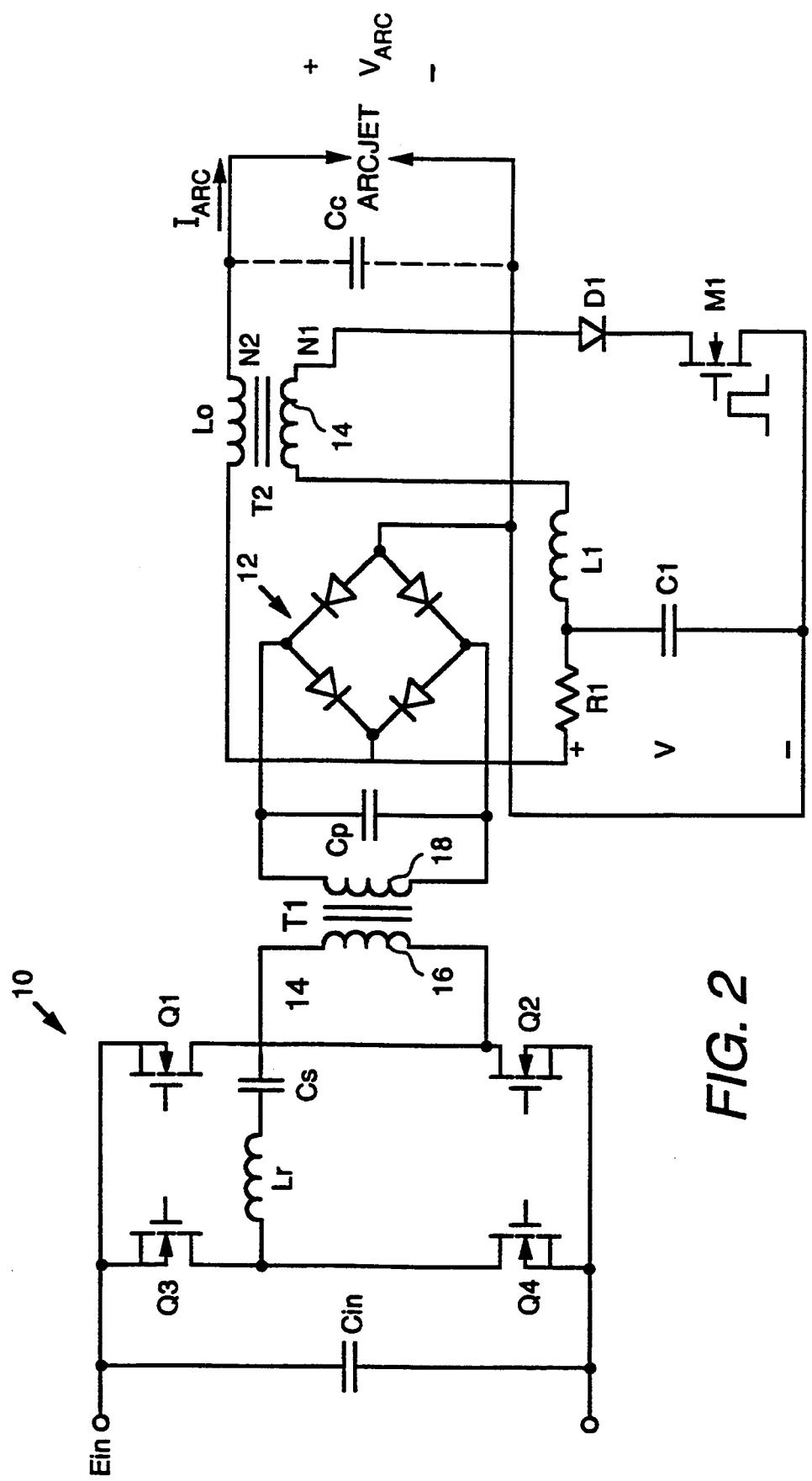
FIG. 2 schematically illustrates an arcjet thruster supply including an alternative embodiment of a resonant high voltage pulser for igniting an arc in an arcjet thruster according to the present invention.

However, for lower converter input voltages, it is desirable to obtain +V from a higher voltage source in order to minimize the turns ratio N2/N1 of transformer T2 and thus its weight. FIG. 2 illustrates an alternative embodiment of the present invention wherein the pulser input voltage +V is obtained from the peak rectified converter output voltage which is often higher than the converter input voltage, represented by Ein in FIG. 2. In operation, capacitor C1 charges to the peak of the ac converter voltage, thereby maximizing the voltage input to the pulser (typically twice the average converter output voltage).

For example, for a 100 V converter output voltage, capacitor C1 would typically charge to approximately 200 V. However, due to resonant ringing at start-up, the voltage across capacitor Cc reflected to the primary side (i.e., the voltage across primary turns N1) resonates to twice this value, yielding a primary winding (N1) voltage of approximately 400 V. Hence, the transformer turns ratio N2/N1 is reduced by a factor of four as compared to simply transformer-coupling 100 V to obtain the high-voltage pulse. In addition, the energy needed to charge the cable capacitance to its high voltage is not stored in the transformer (thus allowing it to be smaller), but is drawn from capacitor C1, which is a high energy density device.

In the embodiment of FIG. 2, converter 10 is illustrated as comprising a full-bridge series/parallel resonant converter of a type described in U.S. patent application Ser. No. 07/956,130, filed Oct. 2, 1992 in the name of R. L. Steigerwald and J. N. Park, cited hereinabove. In particular, series/parallel resonant converter 10 has four switching devices Q1-Q4 coupled in a full-bridge configuration across input dc voltage Ein and an input filter capacitor Cin. Converter 10 further has a resonant tank circuit comprising: a resonant inductor Lr, a series resonant capacitor Cs, and a parallel resonant capacitor Cp. A transformer T1 provides isolation and impedance transformation between converter 10 and the arcjet load. Transformer T1 has a primary winding 16 shown as being coupled between the series combination of capacitor Cs and inductor Lr and the junction joining switching devices Q1 and Q2. (Alternatively, capacitor Cs and inductor Lr could be on the secondary side of transformer T1.) Parallel resonant capacitor Cp is coupled across a secondary winding 18 of transformer T1. The resonant load circuit (comprising diode rectifier 12, filter inductor Lo, and the arcjet load) is connected across parallel resonant capacitor Cp.

Typically, as assumed in the embodiments of FIGS. 1 and 2, the cable connecting the power supply to the thruster is situated between transformer T2 and the arcjet thruster, as illustrated in block diagram in FIG. 3a wherein the cable is represented by the number 50. However, as illustrated in FIG. 3b, transformer T2 and capacitor C1 can be made even smaller by situating transformer T2 on the other end of cable 50 because, in this configuration, less energy storage and charging current are required. In this embodiment, an additional, but smaller, cable 52 is required to connect the primary winding of transformer T2 to the power supply. However, the advantages of requiring less energy storage and charging current may outweigh the disadvantage of using an additional (yet smaller) cable 52 for some applications.

As an additional advantage of the high-voltage pulse circuit of the present invention, the converter switching devices are isolated from the high-voltage starting pulse by transformer T2.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power supply for a thruster, comprising a thruster:
   a power converter for providing an ac voltage;
   a rectifier coupled at the output of said converter for rectifying said ac voltage;
   an output filter inductor connected to said rectifier for smoothing current supplied to said thruster, said filter inductor comprising a secondary winding of a step-up transformer;
   a resonant starting circuit comprising a primary winding of said transformer, a resonant inductance, a storage capacitance, the capacitance of a cable means coupling said filter inductor to said thruster, and switching means, said switching means being activated to release energy stored in said storage capacitance such that the capacitance of said cable means resonates with said inductance and generates a starting pulse to said primary winding, said starting pulse being stepped-up in voltage via said transformer and applied to said thruster for ignition thereof.

2. The power supply of claim 1 wherein said inductance comprises the leakage inductance of said transformer.

3. The power supply of claim 1 wherein said transformer is situated on the same end of said cable as said thruster.

4. The power supply of claim 1 wherein said thruster comprises an arcjet thruster.

5. A resonant starting circuit for a thruster, comprising a thruster:
   a resonant inductance, a storage capacitance, and the capacitance of a cable coupling a thruster power supply to said thruster, coupled to each other;
   a primary winding of a step-up transformer for coupling said resonant inductance and said storage capacitance to said thruster;
   switching means for releasing energy stored in said storage capacitance upon activation thereof such that the capacitance of said cable means resonates with said inductance and generates a starting pulse to said primary winding, said starting pulse being stepped-up in voltage via said transformer and applied to said thruster for ignition thereof.

6. The starting circuit of claim 5 wherein said inductance comprises the leakage inductance of said transformer.

7. The starting circuit of claim 5 wherein said transformer is situated on the same end of said cable as said thruster.

8. The starting circuit of claim 5 wherein said thruster comprises an arcjet thruster.

* * * * *